United States Patent [19]

Proffitt et al.

[11] Patent Number: 5,193,585
[45] Date of Patent: Mar. 16, 1993

[54] DUCKBILL CONSERVATION VENT VALVE

[75] Inventors: Arthur C. Proffitt; William C. Barron, both of Cody, Wyo.

[73] Assignee: Marathon Oil Company, Findlay, Ohio

[21] Appl. No.: 783,474

[22] Filed: Oct. 28, 1991

[51] Int. Cl.⁵ .............................................. F16K 15/14
[52] U.S. Cl. .................................... 137/846; 137/847
[58] Field of Search ................................. 137/846, 847

[56] References Cited

U.S. PATENT DOCUMENTS

| 3,133,696 | 5/1964 | Mirando | 137/846 X |
| 3,565,106 | 2/1971 | Baumbach | 137/847 X |
| 3,967,645 | 7/1976 | Gregory | 137/846 |
| 4,341,239 | 7/1982 | Atkinson | 137/847 X |

FOREIGN PATENT DOCUMENTS 301718  8/1922  Fed. Rep. of Germany ...... 137/846

Primary Examiner—Robert G. Nilson
Attorney, Agent, or Firm—Jack L. Hummel; Jack E. Ebel

[57] ABSTRACT

The present invention relates to a duckbill conservation vent valve comprising an elastomeric tubular body having an axial fluid passageway with an inlet and an outlet. The tubular body progressively narrows in cross section from inlet to outlet, forming opposed sealing lips at the outlet. The lips define a closed slit therebetween. The slit is opened in response to pressure exerted from the inlet in the direction of the slit. The slit is kept closed by means such as applying either external or internal force on opposing ribs which extend radially from the tubular body or by draping a long lip over a slit and a short lip, or by stretching a short lip to equal the length of a long lip and attaching the short lip to the long lip. The duckbill conservation vent valve is capable of being opened by pressure heads of less than about 2 inches of water.

7 Claims, 4 Drawing Sheets

DUCKBILL CONSERVATION VENT VALVE

BACKGROUND OF INVENTION

1. Field of the Invention

The present invention relates to duckbill conservation vent valves utilized to control the direction of fluid flow.

2. Description of Related Art

Duckbill valves are used in a wide variety of situations to prevent the reversal of direction of fluid flow. U.S. Pat. No. 4,524,805 to Hoffman discloses a duckbill valve for controlling the direction of fluid flow in a fluid-conducting conduit. The valve is formed of elastomeric material and comprises a generally axial fluid passageway having an inlet and an outlet end provided with an outlet slit. The valve is progressively narrowing in cross sections from the inlet end to the outlet end to define a pair of opposed sealing lips at the outlet slit. Means for urging the sealing lips closed are comprised of widened lip margins at opposite ends of the outlet slit. The valve is formed by molding the elastomeric material into the preferred shape and then providing the widened lip margins with a closing bias by causing a greater amount of shrinkage in the lip margins, relative to the remaining portions of the sealing lips, during curing of the molded material from an elevated curing temperature to room temperature. Once Hoffman's valve is made, no way exists to vary the strength of the means for urging the sealing lips closed to adapt the valve to changing conditions. Therefore, a need exists for a valve on which the closure force on the valve lips can be varied after the valve body has been constructed to thereby allow the valve user to vary valve lip closure strength as conditions necessitate.

U.S. Pat. No. 3,465,595 to Tansony discloses a liquid sampling device including a submersible container for receiving samples of liquid from a bath thereof for transmission to a testing station external to the bath. The sampler has a duckbill-shaped hose inlet for the liquid functioning as a one-way check valve and also as a screen to prevent entry of undesirable lumps of solids into the container. The duckbill-shaped hose inlet of Tansony's patent prevents lumps of solids from entering the container, but is not disclosed as being capable of functioning as a conservation vent valve, capable of opening at pressures of less than 2 inches of water.

U.S. Pat. Nos. 4,585,031 and 4,607,663 to Raftis and Merritt disclose tide gate valves for large sized conduits which resist inversion and sagging and which open easily. These valves comprise a sleeve bounding a longitudinally extending flow-through passage for fluids. The sleeve has an upstream fluid inlet end region mountable on a discharge end of a conduit which is elongated along an axis of symmetry. The sleeve also has a downstream fluid outlet end region which has an upper lip and a lower lip opposed to each other relative to the axis. The lips are movable from a closed position in which the lips engage each other, to an open position in which the lips are located apart from each other in response to a pressure head within the passage and exerted in a direction downstream of the passage. The sleeve further has a tapered intermediate region. The upper and lower walls respectively merge, and are jointly movable, with the upper and lower lips. The sleeve is constituted, at least in part, of a flexible material and has pads or plies to provide support to the lips to prevent sagging and inversion due to back pressure. Both tide gate valves are suited primarily for prevention of fluid backflow in storm or sanitary sewage lines. Neither tide gate valve is suitable as a conservation vent valve capable of opening at pressure heads of 2 inches of water or less. Thus a need exists for a duck-billed conservation vent valve which is capable of opening at pressure heads of 2 inches of water or less.

Accordingly, it is an object of the present invention to provide a duck-billed conservation valve in which the closure force on the valve lips can be varied after the valve body has been constructed and which is opened at pressure heads of 2 inches of water or less.

SUMMARY OF INVENTION

To achieve the foregoing and other objects, and in accordance with the purposes of the present invention, as embodied and broadly described herein, one characterization of the present invention comprises an elastomeric tubular body having an axial fluid passageway with an inlet and an outlet. The tubular body progressively narrows in cross section from inlet to outlet forming opposed sealing lips at the outlet. The lips define a closed slit therebetween. The lips are capable of spreading apart to open the slit in response to pressure exerted from the inlet in the direction of the slit. The duck-bill valve is also comprised of a pair of opposing ribs extending radially from the tubular body and located along the length of the progressively narrowing tubular body. The duck-billed conservation vent valve is further comprised of means for applying force to the ribs in a direction radially away from said tubular body for closing the slit and thereby sealing the lips when no pressure is exerted in the direction of the slit.

In one embodiment of the present invention the means for applying force to the ribs is external to the tubular body of the valve and is a resilient, flexible rod which is flexed to allow each end of the rod to be positioned within a void extending axially along the length of each rib.

In another embodiment of the present invention, the means for applying force to the ribs is a resilient, flexible rod which is flexed and positioned internally, within the narrowing cross section area of the valve tubular body. This embodiment is also comprised of means for supporting the elastomeric body which are positioned within the voids extending axially along the length of each rib.

In another embodiment of the present invention the duckbill conservation vent valve is comprised of an elastomeric tubular body having an axial fluid passageway with an inlet and an outlet. The tubular body progressively narrows in cross section from the inlet to the outlet forming a long lip and a short lip. The lips define a closed slit therebetween. The long lip is of sufficient length to drape over the slit and over the short lip, thereby closing the slit and sealing the lips. The lips are capable of spreading apart to open the slit in response to pressure exerted from the inlet in the direction of the slit. This embodiment of the duckbill valve also is comprised of a pair of opposing ribs extending from the tubular body. The ribs are located along the length of the narrowing area of the tubular body and each rib contains a void extending axially along the length of each rib in which means for supporting the elastomeric body are positioned.

In another embodiment of the present invention the duckbill conservation vent valve is comprised of an elastomeric tubular body having an axial fluid passageway with an inlet and an outlet. The tubular body progressively narrows in cross section from the inlet to the outlet to form a long lip and a short lip. The short lip is stretched to equal the length of the long lip attached to the long lip at the lip edges. The lips define a closed slit therebetween. The lips are capable of spreading apart to open the slit in response to pressure exerted from the inlet in the direction of the slit. The valve is also comprised of a pair of opposing ribs extending radially from the tubular body, located along the length of the progressively narrowing tubular body. Each rib contains a void extending axially along the length of the rib, and a means for supporting the elastomeric body is positioned within each void.

The pressure head needed to open the valve of all embodiments is exerted from the inlet in the direction of the slit and is less than about 2 inches of water, is preferably less than 1.5 inches of water and is most preferably less than about 1 inch of water.

BRIEF DESCRIPTION OF THE DRAWINGS

The accompanying drawings, which are incorporated in and form a part of the specification, illustrate the embodiments of the present invention and, together with the description, serve to explain the principles of the invention.

In the drawings.

DESCRIPTION OF THE PREFERRED EMBODIMENTS

The present invention is described in the context of specific terms which are defined as follows. "Rod" is any element which is capable of flexing when force is applied to the element and which will return to its original shape when the force is removed. The term "rod" includes, but is not limited to, spring, tubes, struts, arms, studs and shafts. "Fluid" is any liquid or gas capable of flowing from a relatively high pressure locale to a locale of relatively lower pressure.

Figure 1:
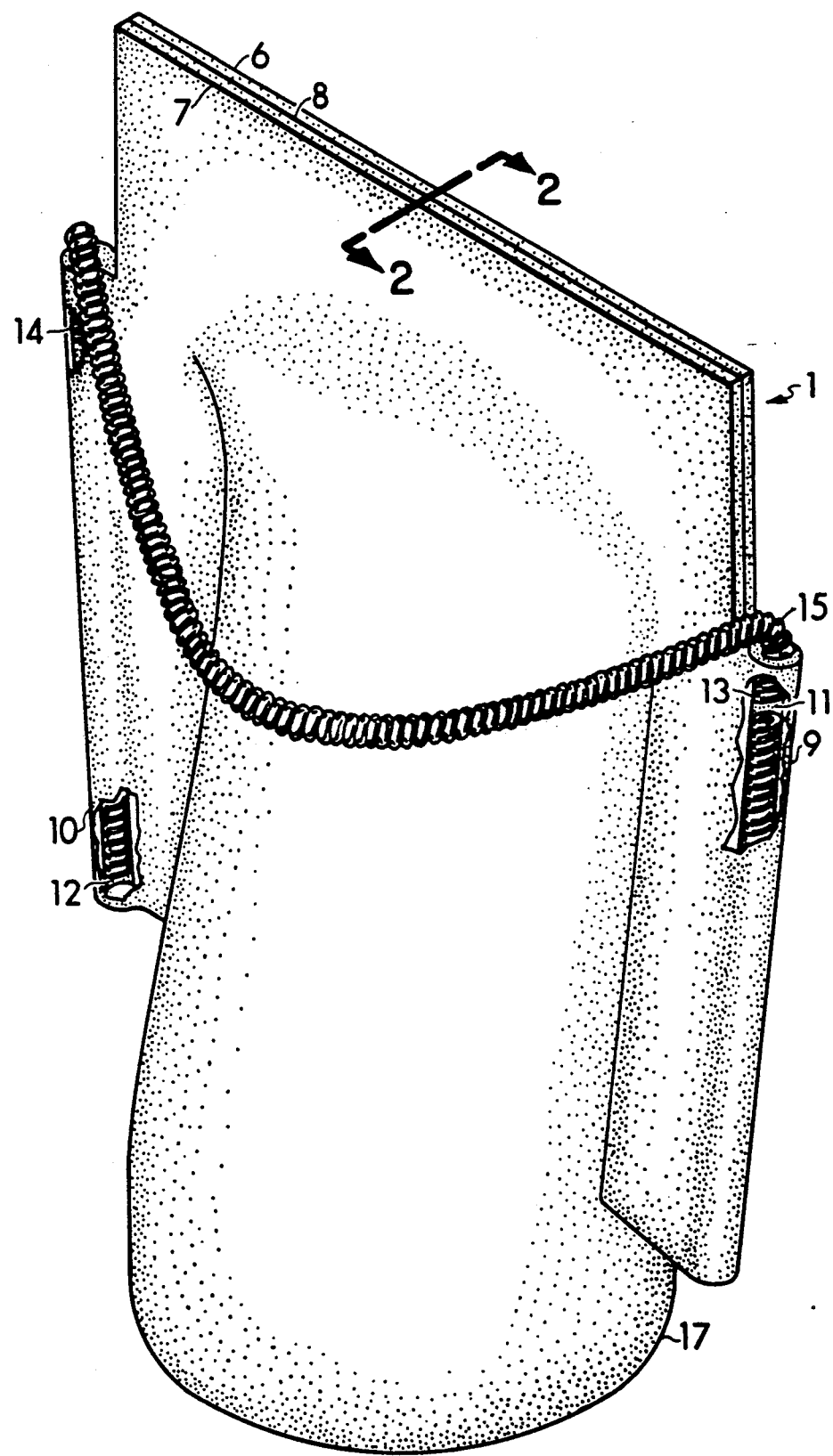
FIG. 1 is a perspective view which depicts a duckbill conservation valve of the present invention in which an external flexible resilient rod is used to exert force on the ribs away from the valve body to close the slit between the valve lips.
Figure 2:
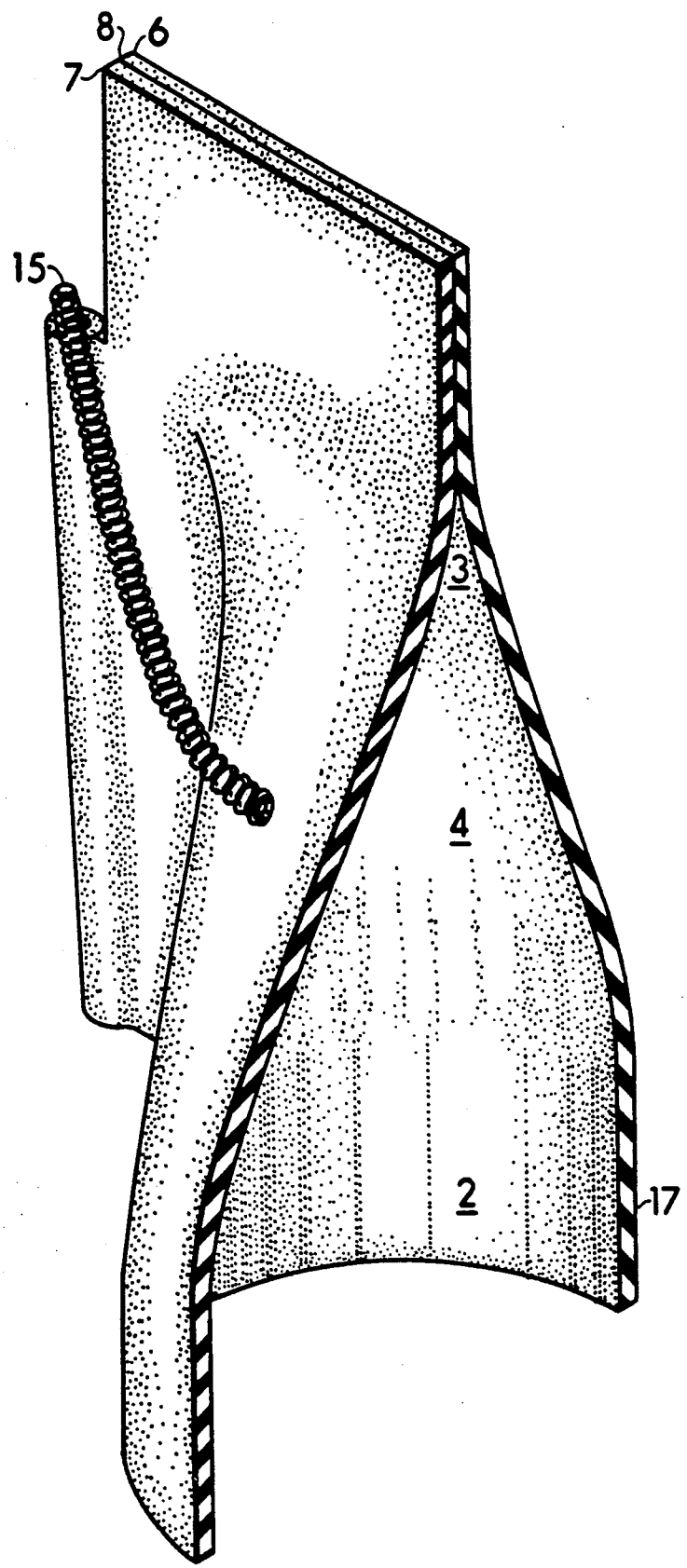
FIG. 2 is a cut-away side view of the valve cut-away through the axis 2-2 depicted in FIG. 1, in which an external flexible resilient rod is used to exert force on the ribs away from the valve body to close the slit between the valve lips.

Referring now to FIGS. 1 and 2, the duckbill conservation vent valve of the present invention is illustrated generally as 1 and is comprised of an elastomeric tubular body having an axial fluid passageway with an inlet 2 and an outlet 3. The tubular body tapers in such a manner that the body of the valve becomes progressively narrow in cross section between the inlet 2 and the outlet 3. This narrowing cross-sectional area is illustrated at 4. As the tubular body narrows in area 4, the axial fluid passageway is reduced to a slit 8 formed between two opposing lips 6 and 7. In order to maintain sealing pressure on lips 6 and 7, two opposing ribs 9 and 10 are formed from the elastomeric tubular body. Ribs 9 and 10 extend radially from the tubular body of the valve and are located on opposite sides of the tubular body along the length of the narrowing cross-sectional area 4. In one embodiment of the invention the ribs each contain a void illustrated as voids 11 and 12. The voids function as receptacles which each hold the ends of an external means for applying force to each rib in a direction generally radially away from the tubular body of the valve to thereby seal lips 6 and 7. The means for applying force to ribs 9 and 10 is illustrated in FIGS. 1 and 2 as an external flexible, resilient rod 15 with an end 13 and an end 14 which are positioned in voids 11 and 12 respectively. The rod 15 maintains a generally radial force on the ribs 9 and 10 away from the tubular body of the valve thereby closing slit 8 and sealing lips 6 and 7. The valve is attached to a fluid outlet (not shown) by an integral elastic sleeve 17. Sleeve 17 is further secured to a fluid outlet by any commercially available clamp, collar, band, or strap or any other mechanical attachment means well known to a person skilled in the art.

Figure 3:
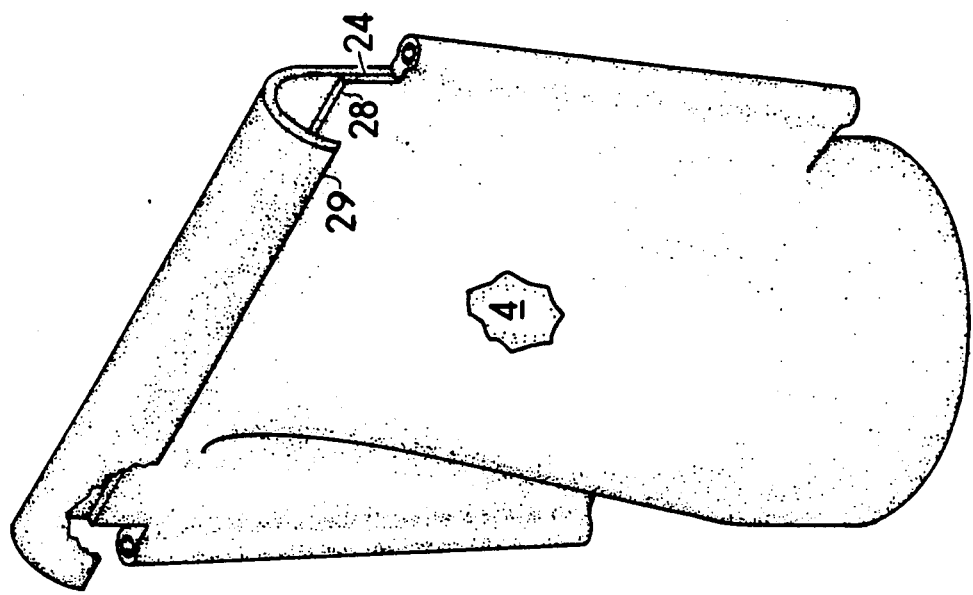
FIG. 3 is a perspective view which depicts a duckbill conservation vent valve of the present invention in which an internal flexible resilient rod is flexed and positioned within the narrowing, cross section area of the tubular body to internally exert force on the ribs away from the valve body to close the slit between the valve lips.

FIG. 3 illustrates another embodiment of this invention wherein the means for applying force to ribs 9 and 10 is supplied by an internal resilient rod 19 which is flexed and positioned within the narrowing cross section area 4 of the valve's tubular body. The rod 19 maintains a generally radial force on ribs 9 and 10 away from the center of the tubular body thereby sealing lips 7 and 8. Also illustrated in FIG. 3 are the means for supporting the tubular body. The means for supporting the tubular body are rods, inserted into the rib voids to keep the elastomeric tubular body of the valve from deforming due to pressure from the weight of the elastomeric tubular body. The means for supporting the tubular body are illustrated in FIG. 3 as rods 21 and 22 which are positioned within voids 11 and 12, respectively.

Figure 4:
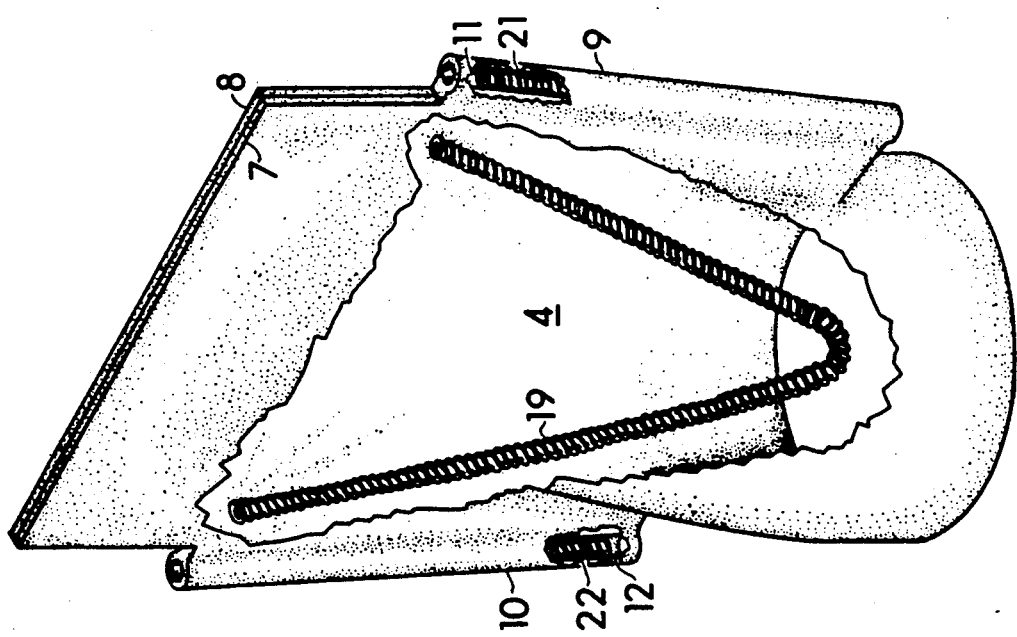
FIG. 4 is a perspective view which depicts a duckbill conservation vent valve of the present invention in which the long lip drapes over the slit and over the short lip thereby closing the slit formed between the valve lips.

FIG. 4 illustrates another embodiment of this invention wherein the progressively narrowing area 4 forms a long lip 29 and a short lip 28 The long lip 29 drapes over the slit 24 and over the short lip 28 thereby sealing lips 29 and 28 and closing slit 24.

Figure 6:
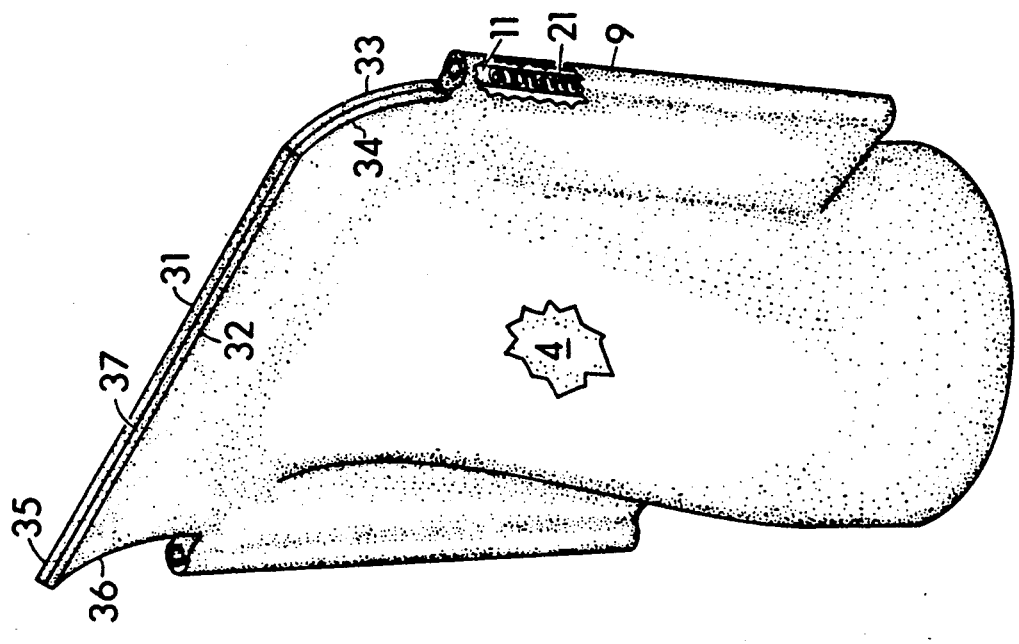
FIG. 6 is a perspective view which depicts a duckbill conservation vent valve of the present invention after stretching and after attachment of the short lip to the long lip.
Figure 5:
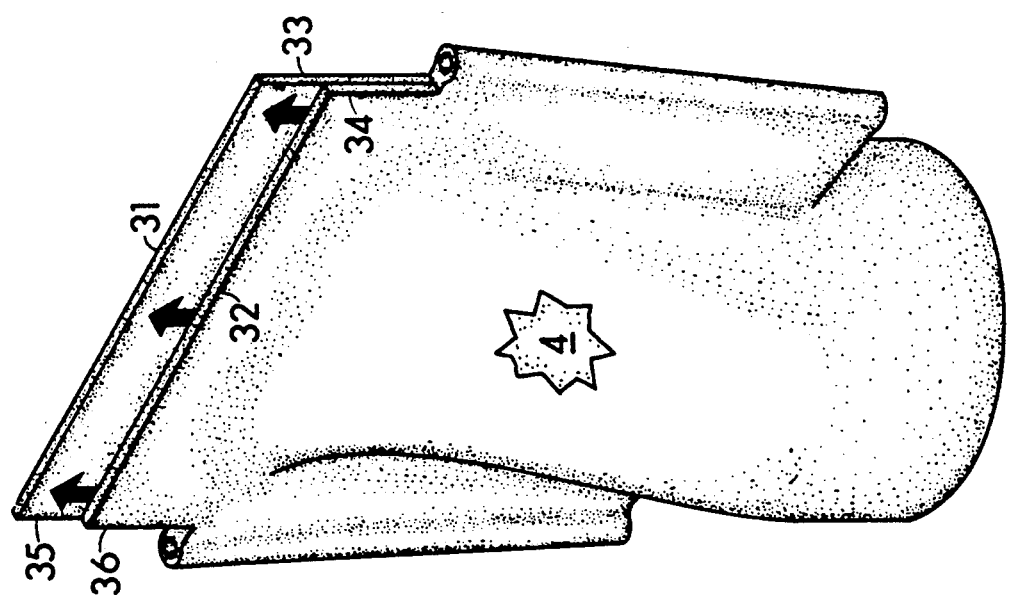
FIG. 5 is a perspective view which depicts a duckbill conservation vent valve of the present invention having a long lip and a short lip prior to stretching the short lip and attaching the short lip to the long lip.

FIGS. 5 and 6 illustrate another embodiment of this invention wherein the progressively narrowing area 4 forms a long lip 31 and a short lip 32. The short lip is stretched to equal the length of the long lip and is attached at edges 33 and 34 and edges 35 and 36 to narrow the axial fluid passageway of the tubular body to a closed slit 37. The short lip is attached to the long lip by glueing or heat sealing edges 33 and 34, and edges 35 and 36 or is attached by any other means for attaching an elastomeric material to an elastomeric material which is well known to one skilled in the art. The stretched short lip pulls on the long lip, causing the long lip to bend, sealing the lips and closing the axial passageway 30 at slit 37 as shown in FIG. 6.

The duckbill valves of this invention are constructed by cutting the desired valve configuration from a sheet of elastomeric material and using folding and adhesives to form the tubular valve body and ribs. Alternatively, the valve body can be cut from a tubular section of elastomer and adhesives used to form the ribs. Finally, the valves, bodies and ribs can be molded using conventional elastomer molding techniques which are well known to the skilled artisan.

The following examples describe several embodiments of the present invention and set forth the best mode contemplated by the inventors of carrying out the invention. These examples are not to be construed as limiting the scope of the invention thereof.

EXAMPLE 1

40 durometer commercial neoprene, 1/16 inch thick is used to make duckbill conservation vent valves. The inlet of each valve is 2½ inches in length, and 4 inches diameter. The narrowing cross-sectional area is 6 inches in length. The means for applying force to the blades is a section of coiled spring steel. The spring steel diameter is 1/16 inch and is wrapped in ¼ inch diameter coils with about 16 coils per inch. Air is passed through the valve at flow rates of 1, 3 and 5 cubic feet/minute and the pressure drop across the valve is measured. The performance data for each valve is shown below.

| LIP LENGTH | LENGTH OF MEANS FOR APPLYING FORCE | FLOW RATE IN STANDARD CUBIC FEET/MINUTE | PRESSURE HEAD IN INCHES OF WATER |
| --- | --- | --- | --- |
| 3¾" | 12" external rod | 1 | 0.2–0.3 |
|  |  | 3 | 0.2–0.3 |
|  |  | 5 | 0.2–0.3 |
| 3" | 12" external rod | 1 | 0.1–0.2 |
|  |  | 3 | 0.1–0.2 |
|  |  | 5 | 0.1–0.2 |
| 2" | 12" external rod | 0 | 0 |
|  |  | 1 | 0.1–0.2 |
|  |  | 3 | 0.1–0.2 |
|  |  | 5 | 0.1–0.2 |

EXAMPLE 2

40 durometer commercial neoprene ⅛ inch thick is used to make duckbill conservation vent valves. The inlet of each valve is 2½ inches in length and 4 inches in diameter. The means for applying force to the blades are sections of coiled spring steel. The spring steel diameter is 1/16 inch and is wrapped in ¼ inch diameter coils with about 16 coils per inch. The narrowing cross-sectional area is 6 inches in length. Air is passed through the valve at flow rates of 1, 3 and 5 cubic feet/minute and the pressure drop across the valve is measured. The performance data for each valve is shown below.

| LIP LENGTH | LENGTH OF MEANS FOR APPLYING FORCE | FLOW RATE IN STANDARD CUBIC FEET/MINUTE | PRESSURE HEAD IN INCHES OF WATER |
| --- | --- | --- | --- |
| 4¼" | 12" external rod | 0 | 0 |
|  |  | 1 | 0.2–0.3 |
|  |  | 3 | 0.3 |
|  |  | 5 | 0.3–0.4 |
| 3" | 12" external rod | 0 | 0 |
|  |  | 1 | 0.1–0.2 |
|  |  | 3 | 0.2–0.3 |
| 2¼" | 12" external rod | 5 | 0.3 |
|  |  | 0 | 0 |
|  |  | 1 | 0.0–0.1 |
|  |  | 3 | 0.1–0.2 |
|  |  | 5 | 02–0.3 |

EXAMPLE 3

40 durometer commercial neoprene, 1/16 inch thick is used to make duckbill conservation vent valves. The inlet of each valve is 2½ inches in length, and 4 inches diameter. The narrowing cross-sectional area is 6 inches in length. The means for applying force to the blades are sections of coiled spring steel. The spring diameter is 1/16 inch and is wrapped in ¼ inches diameters coils with about 16 coils per inch. Air is passed through the valve at flow rates of 1, 3 and 5 cubic feet/minute and the pressure drop across the valve is measured. The performance data for each valve is shown below.

| LIP LENGTH | LENGTH OF MEANS FOR APPLYING FORCE | FLOW RATE IN STANDARD CUBIC FEET/MINUTE | PRESSURE HEAD IN INCHES OF WATER |
| --- | --- | --- | --- |
| 3¾" | No means for applying force | 0 | 0 |
|  |  | 1 | 0 |
|  |  | 3 | 0 |
|  |  | 5 | 0.0–0.1 |
| 3¾" | 14" internal rod | 0 | 0 |
|  |  | 1 | 0.1–0.2 |
|  |  | 3 | 0.2–0.3 |
|  |  | 5 | 0.1–0.3 |
| 3¾" | 10" internal rod | 1 | 0.2–0.3 |
|  |  | 3 | 0.2–0.3 |
|  |  | 5 | 0.2–0.3 |
| 3" | No means for applying force | Valve does not close |  |
| 3" | 14" internal rod | 0 | 0 |
|  |  | 1 | 0.0–0.1 |
|  |  | 3 | 0.1–0.2 |
|  |  | 5 | 0.1–0.2 |
| 3" | 10" internal rod | 1 | 0.2–0.3 |
|  |  | 3 | 0.2–0.3 |
|  |  | 5 | 0.2–0.3 |
| 2" | No means for applying force | Valve does not close |  |
| 2" | 14" internal rod | 0 | 0 |
|  |  | 1 | 0.0–0.1 |
|  |  | 3 | 0.0–0.1 |
|  |  | 5 | 0.0–0.1 |
| 2" | 10" internal rod | 0 | 0 |
|  |  | 1 | 0.2–0.3 |
|  |  | 3 | 0.2–0.3 |
|  |  | 5 | 0.2–0.3 |

EXAMPLE 4

40 durometer commercial neoprene ⅛ inch thick is used to make duckbill conservation vent valves. The inlet of each valve is 2½ inches in length and 4 inches in diameter. The means for applying force to the blades are sections of coiled spring steel. The spring steel diameter is 1/16 inch and is wrapped in ¼ inch diameter coils with about 16 coils per inch. The narrowing cross-sectional area is 6 inches in length. Air is passed through the valve at flow rates of 1, 3 and 5 cubic feet/minute and the pressure drop across the valve is measured. The performance data for each valve is shown below.

| LIP LENGTH | LENGTH OF MEANS FOR APPLYING FORCE | FLOW RATE IN STANDARD CUBIC FEET/MINUTE | PRESSURE HEAD IN INCHES OF WATER |
| --- | --- | --- | --- |
| 4⅞" | No means for applying force | 0 | 0 |
| | | 1 | 0.1 |
| | | 3 | 0.2 |
| | | 5 | 0.2 |
| 4⅞" | 14" internal rod | 0 | 0 |
| | | 1 | 0.1–0.2 |
| | | 3 | 0.2 |
| | | 5 | 0.2 |
| 4⅞" | 10" internal rod | 0 | 0 |
| | | 1 | 0.2 |
| | | 3 | 0.2–0.3 |
| | | 5 | 0.3 |
| 3" | No means for applying force | Valve does not close | |
| 3" | 14" internal rod | Valve does not close | |
| 3" | 10" internal rod | 0 | 0 |
| | | 1 | 0.1 |
| | | 3 | 0.2 |
| | | 5 | 0.3 |
| 2¼" | No means for applying force | Valve does not close | |
| 2¼" | 14" internal rod | Valve does not close | |
| 2¼" | 10" internal rod | 0 | 0 |
| | | 1 | 0.0–0.1 |
| | | 3 | 0.2 |
| | | 5 | 0.2–0.3 |

While the preferred embodiments have been fully described and depicted for the purpose of explaining the principles of the present invention, it will be appreciated by those skilled in the art that modification, substitutions and changes made thereto without departing from the scope of the invention set forth in appended claims.

I claim:

1. A duckbill valve comprising:
   a) a tubular body having an axial fluid passageway with an inlet and an outlet, said tubular body progressively narrowing in cross section from said inlet to said outlet, forming a long lip and a short lip, said short lip stretched to equal the length of said long lip, said long lip and said stretched short lip attached at their edges, said attached lips define therebetween a closed slit, and said lips being capable of spreading apart to open said slit in response to pressure exerted from said inlet in the direction of said slit; and
   b) a pair of opposing ribs extending along the length of said progressively narrowing tubular body.

2. The valve of claim 1 wherein said slit is openable by pressure heads of less than about 2 inches of water.

3. The valve of claim 2 wherein said slit is openable by pressure heads of less than about 1.5 inches of water.

4. The valve of claim 2 wherein said slit is openable by pressure heads of less than about 1.0 inch of water.

5. The valve of claim 1 further comprising:
   c) means for supporting said body.

6. The valve of claim 5 wherein each rib contains a void extending along the length of each said rib.

7. The valve of claim 6 wherein said means for supporting said elastomeric body are first and second flexible resilient rods, said first rod positioned within said void of one of said pair of opposing ribs, said second rod positioned within said void of the other of said pair of opposing ribs.

* * * * *